United States Patent [19]
Ratzsch et al.

[11] Patent Number: 5,585,435

[45] Date of Patent: Dec. 17, 1996

[54] PROCESS FOR GRAFTING POLYOLEFINS

[75] Inventors: Manfred Rätzsch, Kirchschlag, Austria; Achim Hesse, Dresden, Germany; Hartmut Bucka, Leonding, Austria

[73] Assignee: PCD Polymere Gesellschaft m.b.H., Schwechat-Mannswörth, Austria

[21] Appl. No.: 533,254

[22] Filed: Sep. 25, 1995

[30] Foreign Application Priority Data

Sep. 26, 1994 [AT] Austria ................................... 1826/94

[51] Int. Cl.$^6$ ............................. C08L 37/00; C08L 51/06
[52] U.S. Cl. ................................. 525/71; 525/74; 525/78; 525/79; 525/80
[58] Field of Search ................... 525/70, 71, 74, 525/72, 75, 78, 79

[56] References Cited

U.S. PATENT DOCUMENTS

| | | |
|---|---|---|
| 5,079,302 | 1/1992 | Lee et al. |
| 5,100,947 | 3/1992 | Puydak et al. |
| 5,132,363 | 7/1992 | Furuta et al. |
| 5,159,004 | 10/1992 | Furuta et al. |
| 5,244,971 | 9/1993 | Jean-Marc |
| 5,268,425 | 12/1993 | Furuta et al. |
| 5,281,670 | 1/1994 | Lee et al. |
| 5,286,791 | 2/1994 | DeNicola, Jr. et al. |
| 5,370,813 | 12/1994 | DeNicola, Jr. et al. |
| 5,370,941 | 12/1994 | Kiang ..................................... 428/520 |

FOREIGN PATENT DOCUMENTS

| | | |
|---|---|---|
| 0138224A2 | 4/1985 | European Pat. Off. |
| 275160A3 | 1/1990 | German Dem. Rep. |

OTHER PUBLICATIONS

*Patent Abstracts of Japan*, 16(413), p. 157, C 980 (abstract of JP-4-142316) (Sep. 1992).
*Patent Abstracts of Japan*, 13(21), p. 130, C 560 (abstract of JP-63-225609) (Jan. 1989).
*Patent Abstracts of Japan* (unexamined applications), vol. 16, No. 413, p. 157 C980, (Sep. 1992), abstracting JP 04-142316.
*Patent Abstracts of Japan* (unexamined applications), vol. 13, No. 21, p. 103 C560 (Jan. 1989), abstracting JP 63-225609.
*Chemical Abstracts*, 91:124409p (1979) (abstract of JP 54-063194).
*Chemical Abstracts*, 88:153615w (1978) (abstract of JP 52-046979).
*Chemical Abstracts*, 75:141884b (1971) (abstract of JP 45-036038).
*Chemical Abstracts*, 81:92423p (1974) (abstract of JP 49-011275).
*Derwent Abstracts*, 81-50678D/28 (1981) (abstract of JP 56-060224).
*Derwent Abstracts*, 68-26880Q/00 (1968) (abstract of JP 44-007751).
*Derwent Abstracts*, 88-304877 (1988) (abstract of JP 63-225609).

*Primary Examiner*—Melvyn I. Marquis
*Assistant Examiner*—D. Aylward
*Attorney, Agent, or Firm*—Wenderoth, Lind & Ponack

[57] ABSTRACT

Process for the preparation of grafted polyolefins in a fluidized bed fluidized by means of steam and, if appropriate, alcohols.

8 Claims, 1 Drawing Sheet

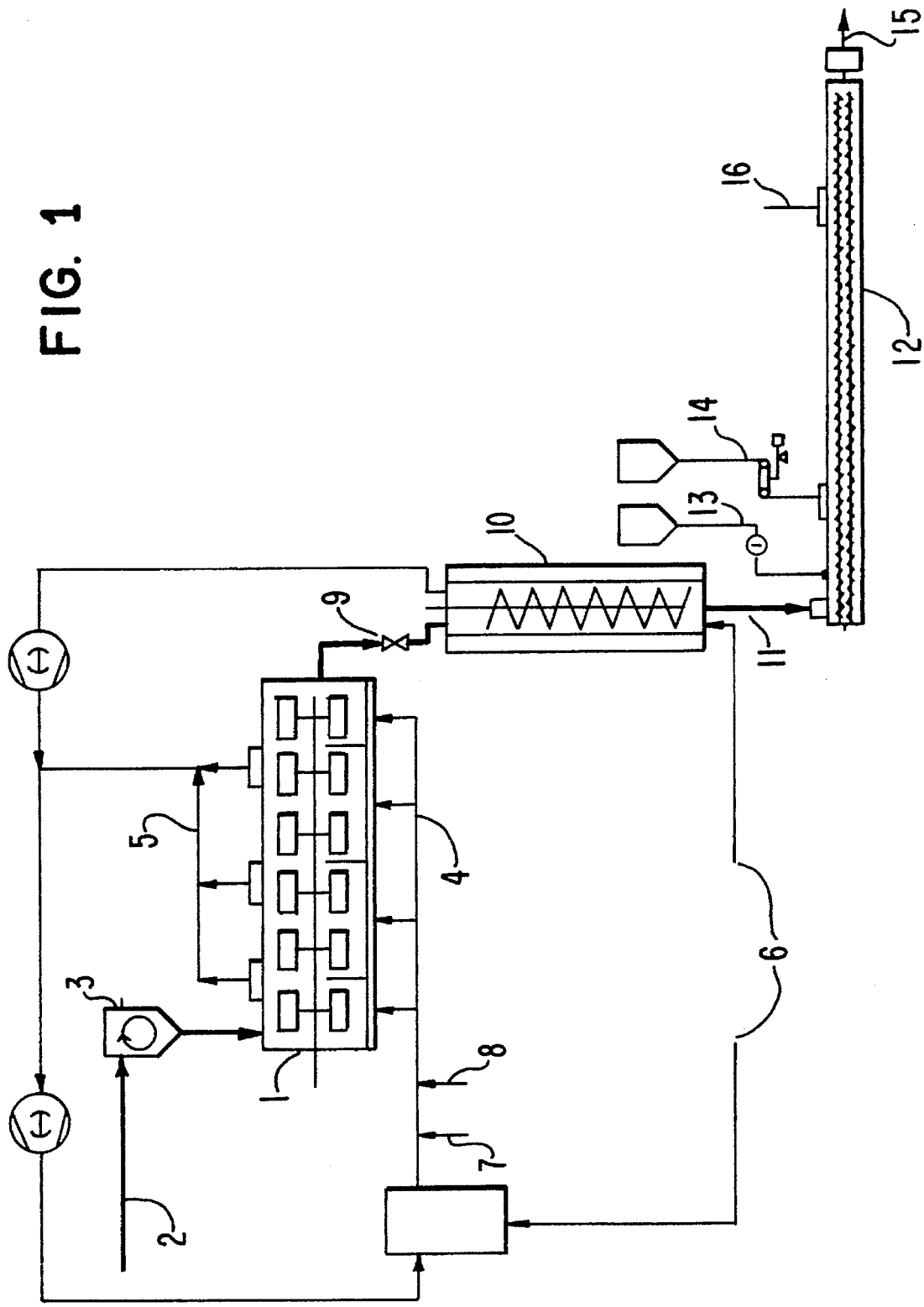

PROCESS FOR GRAFTING POLYOLEFINS

The invention relates to a process for grafting polyolefins in a fluidized bed reactor. It is known to graft polyolefins with polymerizable monomers, such as, for example, ethylenically unsaturated compounds, in the presence of initiators which form free radicals or by formation of free radicals with high-energy beams. For example, EP-A-437 808 describes a grafting process in which polyolefins in solid form are irradiated by means of electron beams and are then sprayed and grafted with the liquid or dissolved grafting monomers in a reactor. According to JP-A-63/90523 and DD Patent 275 159, the grafting reaction of polypropylene is carried out in aqueous dispersion, peroxides or azo compounds being used as agents which form free radicals. The disadvantage of the known grafting processes is, above all, that long reaction times are necessary, or that the yields of grafted polyolefins are only very low.

It was accordingly the object of discovering an operationally reliable grafting process for polyolefins in which high-quality grafted polyolefins can be prepared, in particular with good homogeneity and with a high space/time yield. The object was achieved by using a polyolefin fluidized bed fluidized by means of steam for carrying out the grafting reaction.

The invention accordingly relates to a process for the preparation of grafted polyolefins in which ethylenically unsaturated grafting monomers and, if appropriate, agents which form free radicals are brought into contact with solid polyolefin particles which form a fluidized bed, characterized in that the polyolefin fluidized bed is fluidized by blowing in steam and, if appropriate, $C_1$ - to $C_8$-alkanol vapors. With the process according to the invention it is possible, in particular, to develop grafted olefin homo- or copolymers in a continuous process with a high space/time yield and with good homogeneity as well as a wide range of variation of the process conditions, reliable operation being guaranteed, even with solids which have poor flow properties, stick to one another and tend to move to the walls. Process conditions are to be understood here as meaning, above all, the reaction temperature, the reaction pressure and the concentrations of the components participating in the reaction. In addition, the residence time distribution is of substantial importance for the structure and properties of the polymers. To prepare homogeneous products, it is essential to realize narrow residence time distributions, such as are rendered possible with the process according to the invention.

The polyolefins employed for grafting are prepared by customary processes, such as, for example, by solution, slurry or gas phase polymerization. Examples of possible polyolefins are the homo- or copolymers of ethylene, propylene, 1-butene, 1-hexene, 4-methyl-1-pentene, 1-octene or cyclopentene. The homo- and copolymers of ethylene, propene and 1-butene are preferred. Polypropylene and propylene-ethylene copolymers are particularly preferred.

Grafting is particularly simple if it is carried out directly after the polymerization. In this case, the polyolefin discharged virtually continuously from a gas phase reactor or from the flash chamber of a slurry reactor is conveyed with superheated steam of a mixture of water and, if appropriate, an alkanol such as, for example, methanol or ethanol, into a fluidized stirred bed reactor and thereby heated up to the reaction temperature. The reaction is preferably carried out under a pressure of 0.1 to 5 bar, particularly preferably under 0.5 to 3 bar, and at a temperature of 60° to 150° C., particularly preferably at 90° to 130° C.

In addition to methanol vapor or ethanol vapor, vapors of $C_3$ - to $C_8$-alkanols can also be added to the steam employed for fluidizing the fluidized bed. The use of $C_1$ - to $C_4$-alkanols is preferred, and methanol is particularly preferably added. Steam either by itself or as a mixture with alkanols can be blown in as the fluidizing agent, the vapor mixture comprising 0.1 to 1.0, preferably 0.4 to 1.0 part by weight of water and 0 to 0.9, preferably 0 to 0.5 part by weight of alkanol.

The grafting monomers used according to the invention are vinyl monomers, such as are described, for example, in EP-A-437 808 or in DE-A-43 30 356. Typical examples of these are ethylenically unsaturated carboxylic acids or derivatives thereof, such as, for example, anhydrides, esters, amides, nitriles or halides, vinyl-substituted aromatic or heteroaromatic compounds or aliphatic vinyl compounds or mixtures thereof. Preferred grafting monomers are compounds from the group consisting of unsaturated carboxylic acids and derivatives thereof, the vinyl- or divinylaromatics and the aliphatic dienes. Maleic anhydride, styrene, acrylonitrile, methacrylonitrile, acrylic esters and methacrylic esters are particularly preferred.

In the case where agents which form free radicals are used, peroxidic initiators, such as, for example, per-esters, diacyl peroxides, for example dilauroyl and dibenzoyl peroxide, dialkyl peroxydicarbonates, for example diisopropyl and di-(2-ethylhexyl) peroxydicarbonate, peroxy-ketals, alkyl peroxides or diazo compounds, such as, for example, 2,2'-azo-bis(isobutyronitrile), are employed in particular. Other possible agents which form free radicals are described, for example, in EP-A-461 881. Preferred agents which form free radicals are organic peroxides having half-lives of 4 to 40 minutes at 100° C., such as, for example, t-butyl peroxypivalate, t-butyl peroxy-2-ethylhexanoate and dibenzoyl peroxide.

Grafting monomers and agents which form free radicals can either be added directly to the polyolefins to be grafted, or, in a preferred process, the grafting monomers and, if appropriate, the agents which form free radicals are blown in together with the vapor for fluidizing the fluidized bed.

The vapor mixture blown into the lower part of the fluidized bed preferably comprises 0.1 to 1.0 part of water, 0 to 0.9 part of methanol, 0.1 to 0.9 part of grafting monomers and 0 to 0.03 part of the agent which forms free radicals.

The fluidized bed preferably comprises polypropylene powder or granules. It can additionally be agitated by paddles mounted on a shaft, and in this way be particularly effectively prevented from coagulation. Re-mixing of the granules is largely prevented by possible further suitable baffles.

The majority of the monomers dissolved in the grafted polyolefin is removed by customary procedures, such as, for example, lowering the pressure and increasing the temperature. The monomer vapors thereby removed by suction are compressed, cooled and recycled to the vapor circulation of the reactor.

In another preferred process, after the grafting reaction the grafted polyolefins are melted and brought into contact with maleic anhydride (MAA), the majority of any still unreacted residual monomers being removed. The reaction proceeds especially well in the case of remaining residual styrene in particular. Melting is preferably carried out in an extruder, preferably in a twin-screw extruder, the MAA preferably being added as a solution in a readily volatile solvent, such as, for example, acetone.

BRIEF DESCRIPTION OF THE DRAWINGS

The fluidized bed can be maintained either in a vertical or a horizontal reactor. FIG. 1 shows, by way of example, a particularly preferred process variant with a horizontal reactor (1). (2) designates the polyolefin feed, and (3) a powder separator. The polyolefin powder is fluidized by a gas mixture (4) passed in circulation, which comprises steam (6), alkanol vapors, if appropriate, grafting monomers (7) and agents which form free radicals (8). If appropriate, the agents which form free radicals and the grafting monomers are added via suitable evaporators. The circulating gas emerging from the reactor (1) at (5), which comprises, in particular, grafting monomers which have still not been absorbed, steam and, if appropriate, alkanol vapors, is compressed with a circulating gas compressor and conveyed back to the lower part of the reactor (1). After a residence time of about 30 to 150 minutes, the modified polyolefin, which may still contain unreacted grafting monomers and agents which form free radicals, passes via a sluice (9) into the after-reactor (10), through which steam (6), which contains small amounts of highly volatile stabilizers, if appropriate, is conveyed in counter-current. The polyolefin is then conveyed from the after-reactor (10) continuously into an extruder (12), where it is melted in the intake zone. Readily volatile solvents, such as, for example, acetone or water, which contain reactive components, such as, for example, maleic anhydride, if appropriate, can be added at (13) and polymer auxiliaries, such as, for example, stabilizers, lubricants, antiblocking agents, fillers and the like, can be added at (14). After practically complete removal of all the unreacted grafting monomers by a vacuum degassing (16), the polyolefin melt is granulated by underwater granulation (15).

EXAMPLE 1

200 kg/hour of polypropylene powder (PP homopolymer, MFI 3 dg/minute, PCD-Polymere) were fed pneumatically at (2) into a fluidized bed reactor (1) stirred with paddles and having a filling volume of 0.4 m$^3$, as shown schematically in FIG. 1. The fluidized bed was maintained with 950 m$^3$/hour at s.t.p. of a circulating gas (4) which comprised 40 mol% of water, 58 mol% of styrene and 2 mol% of t-butyl peroxy-2-ethylhexanoate (Akzo). The temperature in the reactor was 110° C., the pressure was 0.19 bar and the average residence time of the polypropylene was 60 minutes. The grafted polypropylene was then conveyed continuously into the after-reactor (10) (103° C., 0.09 bar), melted in a twin-screw extruder with an L/D ratio of 30 at 250° C. with the addition of 0.25 kg/hour of a 1:1 stabilizer mixture of Irgaphos 168 and Irganox 1010 (Ciba) and granulated. During the grafting reaction, no caking was observed in the reactor, and a homogeneous product was obtained with an output of 250 kg/hour.

The styrene-grafted polypropylene had the following characteristic values:

| | |
|---|---|
| MFI (melt flow index at 230° C./ 2.16 kg) | 2 dg/minute |
| elasticity modulus (DIN 53452/57) | 2100 MPa |
| Polystyrene content | 10% by weight grafted |
| | 8% by weight homopolymer |

The polystyrene content was measured by extraction with dichloroethane for 24 h at the boiling point in a Soxhlet apparatus. After the extraction had ended, the samples were dried to constant weight in vacuo.

EXAMPLES 2 AND 3

A polypropylene grafted with styrene was prepared analogously to Example 1, but the process parameters listed in Table 1 were used. t-Butyl peroxybenzoate was employed as the agent which forms free radicals in

EXAMPLE 3

No caking was found in the reactor. The products obtained were homogeneous and had the property values listed in Table 2.

COMPARISON EXAMPLE V1

A polypropylene grafted with styrene was prepared analogously to Example 1, but nitrogen was employed instead of steam in the circulating gas and the process parameters listed in Table 1 were used. t-Butyl peroxybenzoate was employed as the agent which forms free radicals.

The resulting product was very inhomogeneous. Because of caking on the reactor, the plant had to be taken out of service after 6 hours.

TABLE 1

Grafting conditions

| | | | Reaction conditions in the grafting reactor | | | |
|---|---|---|---|---|---|---|
| | Composition of the circulating gas | | | | Average residence | Amount of circulating gas |
| Example | Component | Mol percent | Temperature in 0° C. | Pressure in bar | time in minutes | in m$^3$/hour |
| 1 | Water | 40 | 110 | 0.19 | 60 | 950 |
| | Nitrogen | | | | | |
| | Styrene | 58 | | | | |
| | Hexanoate | 2 | | | | |
| | Benzoate | | | | | |
| 2 | Water | 87 | 140 | 0.89 | 120 | 990 |
| | Nitrogen | | | | | |
| | Styrene | 13 | | | | |
| | Hexanoate | | | | | |
| | Benzoate | | | | | |
| 3 | Water | 87 | 130 | 0.89 | 50 | 970 |
| | Nitrogen | | | | | |
| | Styrene | 10 | | | | |
| | Hexanoate | | | | | |
| | Benzoate | 3 | | | | |
| Comparison Example | Water | | 130 | 0.89 | 70 | 1100 |
| | Nitrogen | 65 | | | | |
| | Styrene | 34 | | | | |
| | Hexanoate | | | | | |
| | Benzoate | 1 | | | | |

TABLE 2

Product characteristic values

| | | Elasticity | Polystyrene content (% by weight) | |
|---|---|---|---|---|
| Example | MFI* (dg/minute) | modulus (MPA) | Grafted | Homopolymer |
| 1 | 2 | 2100 | 10 | 8 |
| 2 | 2 | 1900 | 8 | 3 |
| 3 | 2 | 2030 | 10 | 8 |
| V1 | inhomogeneous product, widely varying values | | | |

*230° C./2.16 kg (DIN 53735)

What we claim is:

1. Process for the preparation of grafted polyolefins in which ethylenically unsaturated grafting monomers and, optionally, agents which form free radicals are brought into contact with solid polyolefin particles which form a fluidized bed, wherein the polyolefin fluidized bed is fluidized by blowing in steam and, optionally, $C_1$ - to $C_8$-alkanol vapors.

2. Process according to claim 1, wherein the vapor comprises a mixture of 0.1 to 1.0 part by weight of water and 0 to 0.9 by weight of alkanol.

3. Process according to claim 1, wherein the grafting monomers and if appropriate agents which form free radicals are blown into the fluidized bed together with the vapor.

4. Process according to claim 1, wherein polypropylenes or propylene/ethylene copolymers are employed as the polyolefins.

5. Process according to claim 1, wherein compounds from the group consisting of unsaturated carboxylic acids and derivatives thereof, the vinyl- or divinylaromatics and aliphatic dienes are employed as the grafting monomers.

6. Process according to claim 1, wherein the grafted polyolefins are melted and brought into contact with maleic anhydride.

7. Process according to claim 2, wherein the vapor comprises a mixture of 0.4 to 1.0 part by weight of water and 0 to 0.5 part by weight of alkanol.

8. Process according to claim 6, wherein the maleic anhydride is in the form of a solution in a readily volatile solvent.

* * * * *